US012695256B2

(12) United States Patent
Yang et al.

(10) Patent No.: US 12,695,256 B2
(45) Date of Patent: Jul. 28, 2026

(54) CONNECTOR

(71) Applicant: Delta Electronics, Inc., Taoyuan City (TW)

(72) Inventors: Shan-Chun Yang, Taoyuan City (TW); Chien-Chun Chen, Taoyuan City (TW); Vincent Mark Byrne, Taoyuan City (TW)

(73) Assignee: Delta Electronics, Inc., Taoyuan City (TW)

( * ) Notice: Subject to any disclaimer, the term of this patent is extended or adjusted under 35 U.S.C. 154(b) by 351 days.

(21) Appl. No.: 18/523,793

(22) Filed: Nov. 29, 2023

(65) Prior Publication Data

US 2024/0297468 A1 Sep. 5, 2024

Related U.S. Application Data

(60) Provisional application No. 63/449,909, filed on Mar. 3, 2023.

(30) Foreign Application Priority Data

Sep. 8, 2023 (CN) ........................ 202311157817.5

(51) Int. Cl.

*H01R 27/02* (2006.01)
*H01R 12/58* (2011.01)
(Continued)

(52) U.S. Cl.

CPC ........... *H01R 27/02* (2013.01); *H01R 12/585* (2013.01); *H01R 12/7088* (2013.01); *H01R 12/716* (2013.01); *H01R 13/11* (2013.01)

(58) Field of Classification Search

CPC .. H01R 27/02; H01R 12/585; H01R 12/7088; H01R 12/716; H01R 12/724; H01R 13/11
(Continued)

(56) References Cited

U.S. PATENT DOCUMENTS

| | | | |
|---|---|---|---|
| 6,848,950 B2 | 2/2005 | Allison et al. | |
| 8,348,680 B2 * | 1/2013 | McClellan ............ | H05K 1/141 439/79 |

(Continued)

FOREIGN PATENT DOCUMENTS

| | | |
|---|---|---|
| CN | 100429834 C | 10/2008 |
| CN | 202308419 U | 7/2012 |

(Continued)

*Primary Examiner* — Gary F Paumen
(74) *Attorney, Agent, or Firm* — KIRTON McCONKIE; Evan R. Witt

(57) ABSTRACT

A connector is disclosed and includes a main body, a circuit board and a signal connection socket. The main body includes an input side, an output side, power inputs, signal inputs, power outputs and signal outputs. The input side is opposite to the output side, the power inputs and the signal inputs are arranged on the input side respectively, the power outputs are arranged on the output side, the power outputs are electrically connected to the power inputs, and the signal outputs are disposed on a bottom side and electrically connected to the signal inputs. The bottom side is connected between the input side and the output side. The circuit board includes an upper surface, and the bottom side is attached to the upper surface. The signal connection socket is disposed on the upper surface and electrically connected to the signal outputs through the circuit board.

14 Claims, 6 Drawing Sheets

(51) Int. Cl.

| | |
|---|---|
| ***H01R 12/70*** | (2011.01) |
| ***H01R 12/71*** | (2011.01) |
| ***H01R 13/11*** | (2006.01) |

(58) Field of Classification Search

USPC .................................................... 439/79, 638

See application file for complete search history.

(56) References Cited

U.S. PATENT DOCUMENTS

| | | | | |
|---|---|---|---|---|
| 8,573,988 | B2 * | 11/2013 | Fujikawa ............. | H01R 12/722 439/79 |
| 8,690,589 | B2 * | 4/2014 | Ngo ..................... | H01R 12/721 439/79 |
| 8,696,390 | B2 | 4/2014 | Tai et al. | |
| 8,860,889 | B2 * | 10/2014 | Choi .................... | H01R 12/712 348/730 |
| 8,899,996 | B2 * | 12/2014 | Lim ................... | H01R 13/6585 439/607.05 |
| 9,735,526 | B1 | 8/2017 | Chen | |
| 10,951,013 | B2 | 3/2021 | Huang | |

FOREIGN PATENT DOCUMENTS

| | | | |
|---|---|---|---|
| CN | 203911048 | U | 10/2014 |
| CN | 113451820 | B | 2/2023 |
| TW | 202236746 | A | 9/2022 |

* cited by examiner

CONNECTOR

CROSS-REFERENCE TO RELATED APPLICATION

This application claims the benefit of U.S. Provisional Application No. 63/449,909 filed on Mar. 3, 2023, and entitled "HYBRID POWER CONNECTOR". This application also claims priority to China Patent Application No. 202311157817.5, filed on Sep. 8, 2023. The entireties of the above-mentioned patent applications are incorporated herein by reference for all purposes.

FIELD OF THE INVENTION

The present disclosure relates to an electronic assembly structure, and more particularly to a connector combining high-current power supply and signal transmission to reduce the material costs, optimize the assembling process, and improve the space utilization.

BACKGROUND OF THE INVENTION

In a conventional communication power module, the circuit board is used to carry a large current, and it is necessary to dispose a large area of copper bars on the circuit board to help the heat dissipation. However, if the module capacity is to be improved and a higher current is used in the future, the feasibility of large-area copper for heat dissipation will be limited. In addition, when the power module needs to increase the depth of the system, as the system output current is increased, more space is required for soldering the copper bars and more layers of circuit board are required. Due to the high complexity of the multi-layer circuit board manufacturing process and the system wire and copper busbar fastening process, the overall manufacturing man-hour will be increased. Moreover, the additional materials (such as the copper bars, the circuit boards, the screws, the insulation sheets, etc.) will also increase the cost of materials.

On the other hand, in the conventional communication power module, the signal pins and the power outputs are located at the rear side of the connector, it results in a limited number of power output groups. Furthermore, the space utilization cannot be improved, and the assembling operation are interfered. It needs to be overcome by adjusting the assembling process. An additional wire is required to be assembled on the sheet metal for grounding, and the extra cost of materials is increased.

Therefore, there is a need of providing a connector combining high-current power supply and signal transmission to reduce the material costs, optimize the assembling process, improve the space utilization, and obviate the drawbacks encountered by the prior arts.

SUMMARY OF THE INVENTION

An object of the present disclosure is to provide a connector combining high-current power supply and signal transmission to reduce the material costs, optimize the assembling process, and improve the space utilization.

Another object of the present disclosure is to provide a hybrid power connector suitable for connecting to a communication power module. The power inputs and the power outputs are disposed on the opposite input side and output side of the main body, respectively. Each power output includes for example a copper sheet with a screw-fixing hole, and the wire and the copper bar are fixed to the power output, so as to reduce the cost of materials and optimize the assembling procedures. When the signal inputs and the power inputs are introduced from the front input side, the power inputs are electrically connected to the rear power outputs and led out through the output side, and the signal inputs are electrically connected to the signal outputs on the bottom of the main body and then led out through the inner trace of the circuit board below, so as to increase the space utilization. The signal outputs include a plurality of signal output pins, which are fixed to the circuit board through the soldering process, so that the signal can be led out through the trace of the circuit board to the terminal on the circuit board, such as the signal connection socket on the extension portion, to optimize the assembling process. On the other hand, a plurality of power output pins, disposed on the bottom of the main body and electrically connect to the ground input on the input side, are fixed to the circuit board through the soldering process. In that, the grounding is guided to a specific area through the trace of the circuit board, and the circuit board is overlapped with the other metal parts to achieve the purpose of grounding. It allows to arrange a ground conductor in conjunction with the fastening holes of the main body and the circuit board to simultaneously realize the ground connection when the connector is fixed to the housing, and the assembling process is further optimized. Since the power inputs, the signal inputs and the ground input are all arranged on the input side, guide grooves can be set on the input side to guide the docking pin of the communication power module for insertion along the direction from the input side to the output side, so as to complete the docking of the communication power module and the connector easily, and optimize the assembling process.

In accordance with an aspect of the present disclosure, a connector is provided. The connector includes a main body, a circuit board and at least one signal connection socket. The main body includes an input side, an output side, a plurality of power inputs, a plurality of signal inputs, a plurality of power outputs and a plurality of signal outputs. The input side is opposite to the output side in a first direction, the plurality of power inputs and the plurality of signal inputs are arranged along a second direction on the input side, the first direction is perpendicular to the second direction, the plurality of power outputs are arranged along the second direction on the output side, the plurality of power outputs are electrically connected to the plurality of power inputs, the plurality of signal outputs are disposed on a bottom side of the main body and electrically connected to the plurality of signal inputs, and the bottom side is connected between the input side and the output side. The circuit board includes an upper surface. The bottom side of the main body is attached to the upper surface. The at least one signal connection socket is disposed on the upper surface and electrically connected to the plurality of signal outputs through the circuit board.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

Figure 1:
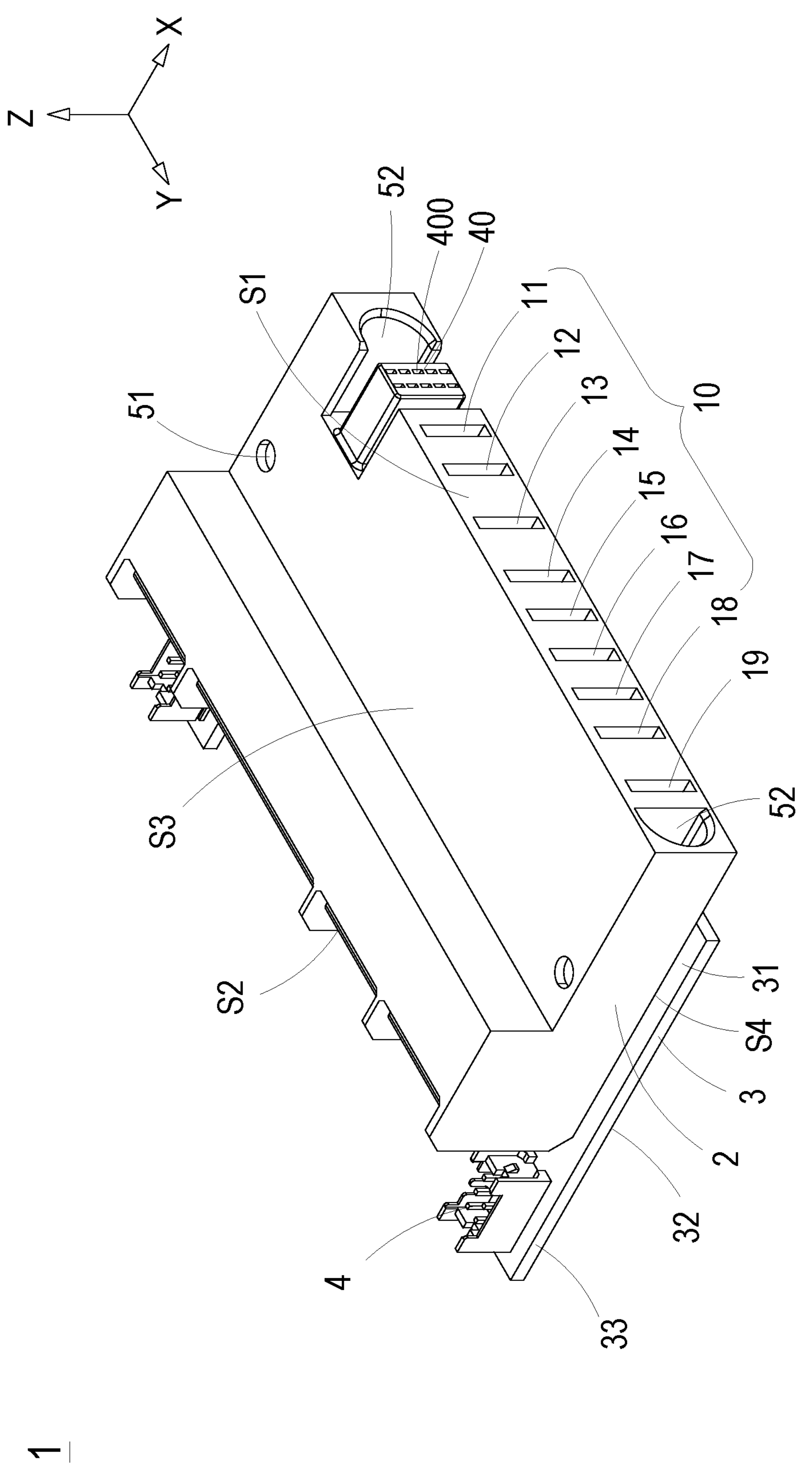
FIG. 1 is a schematic structural view illustrating a connector according to an embodiment of the present disclosure from a front view.
Figure 2:
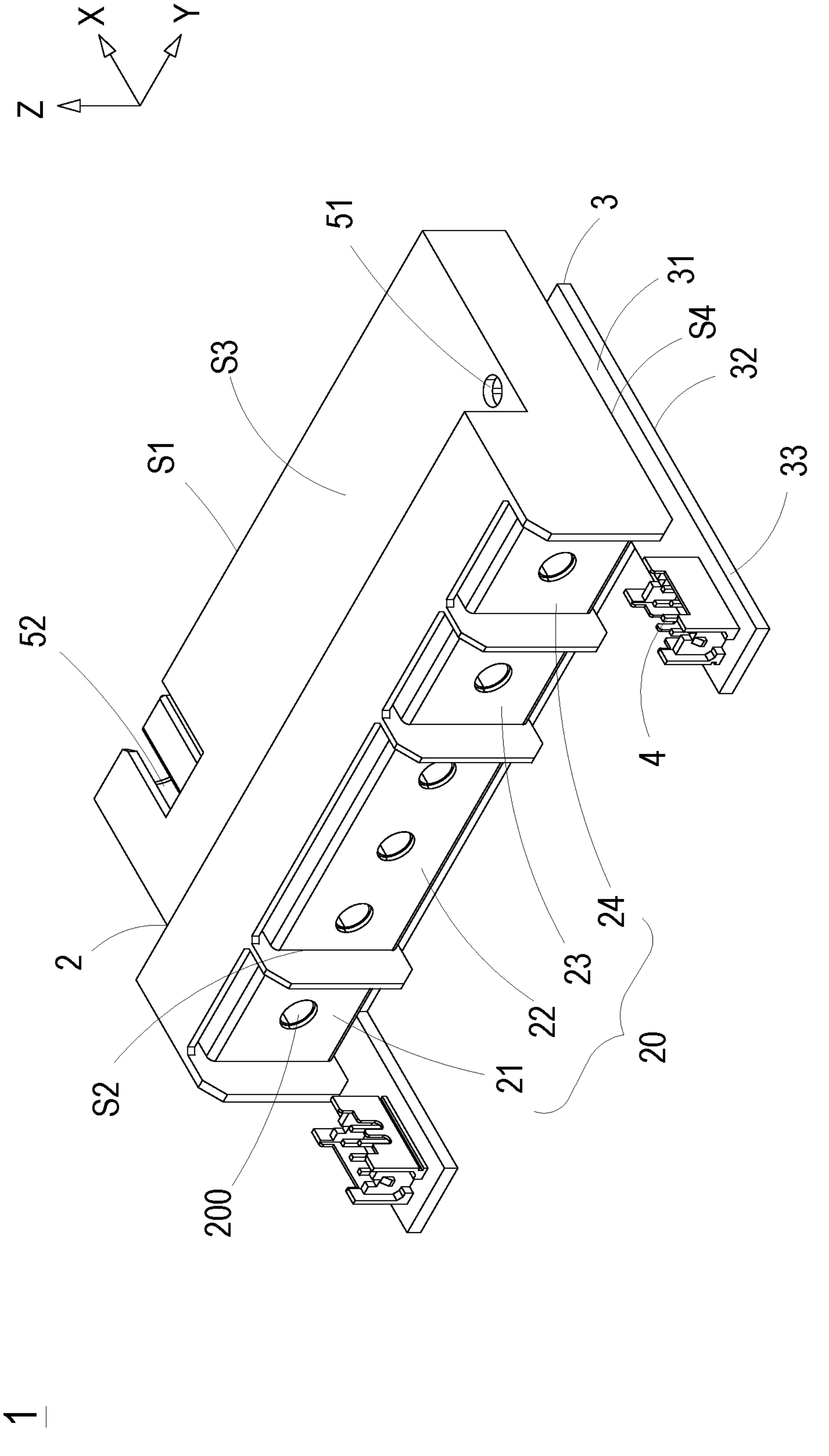
FIG. 2 is a schematic structural view illustrating the connector according to the embodiment of the present disclosure from a rear perspective.
Figure 3:
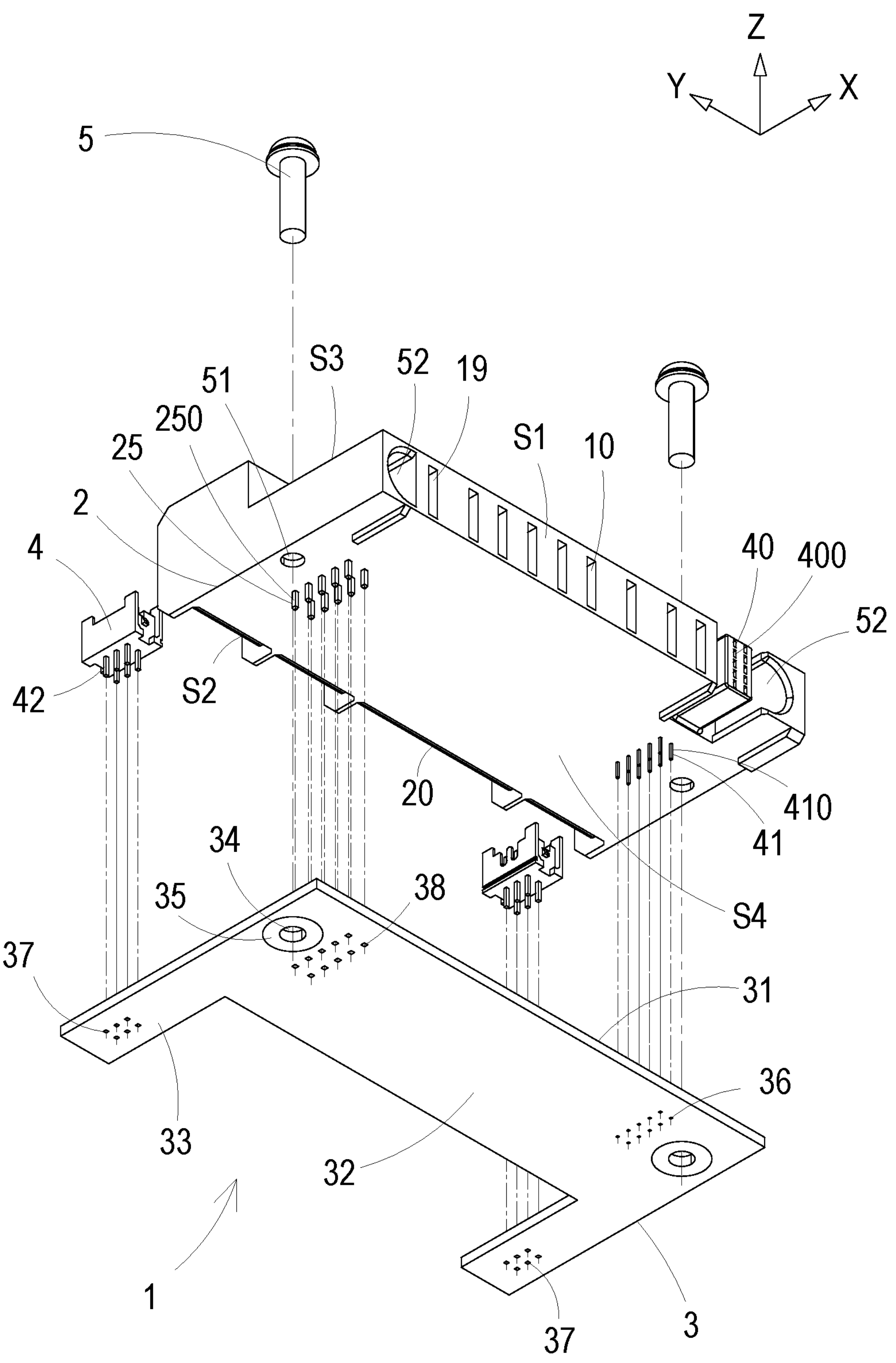
FIG. 3 is an exploded view illustrating the connector according to the embodiment of the present disclosure from a lower perspective.
Figure 4:
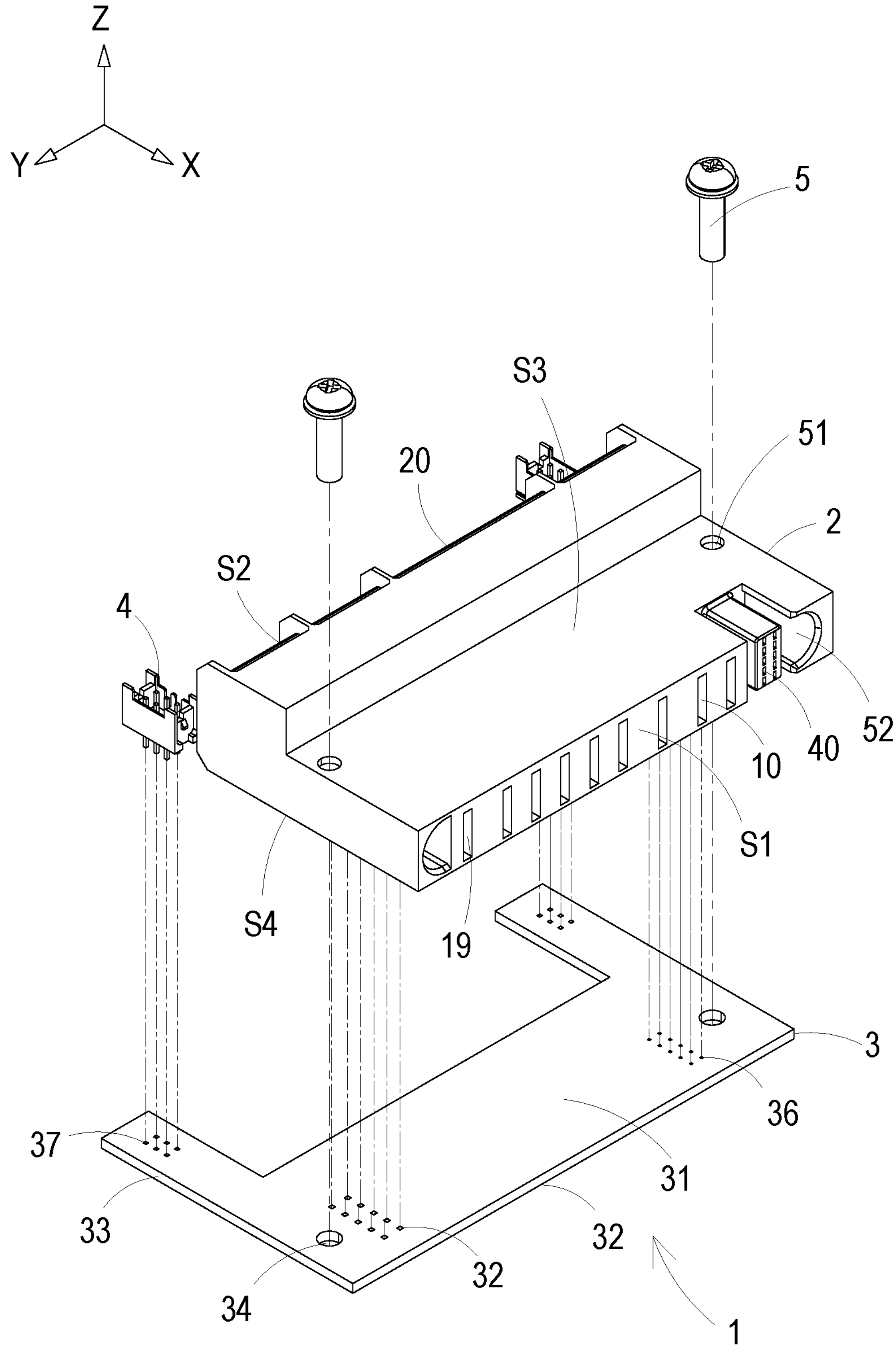
FIG. 4 is an exploded view illustrating the connector according to the embodiment of the present disclosure from an upper perspective.
Figure 5:
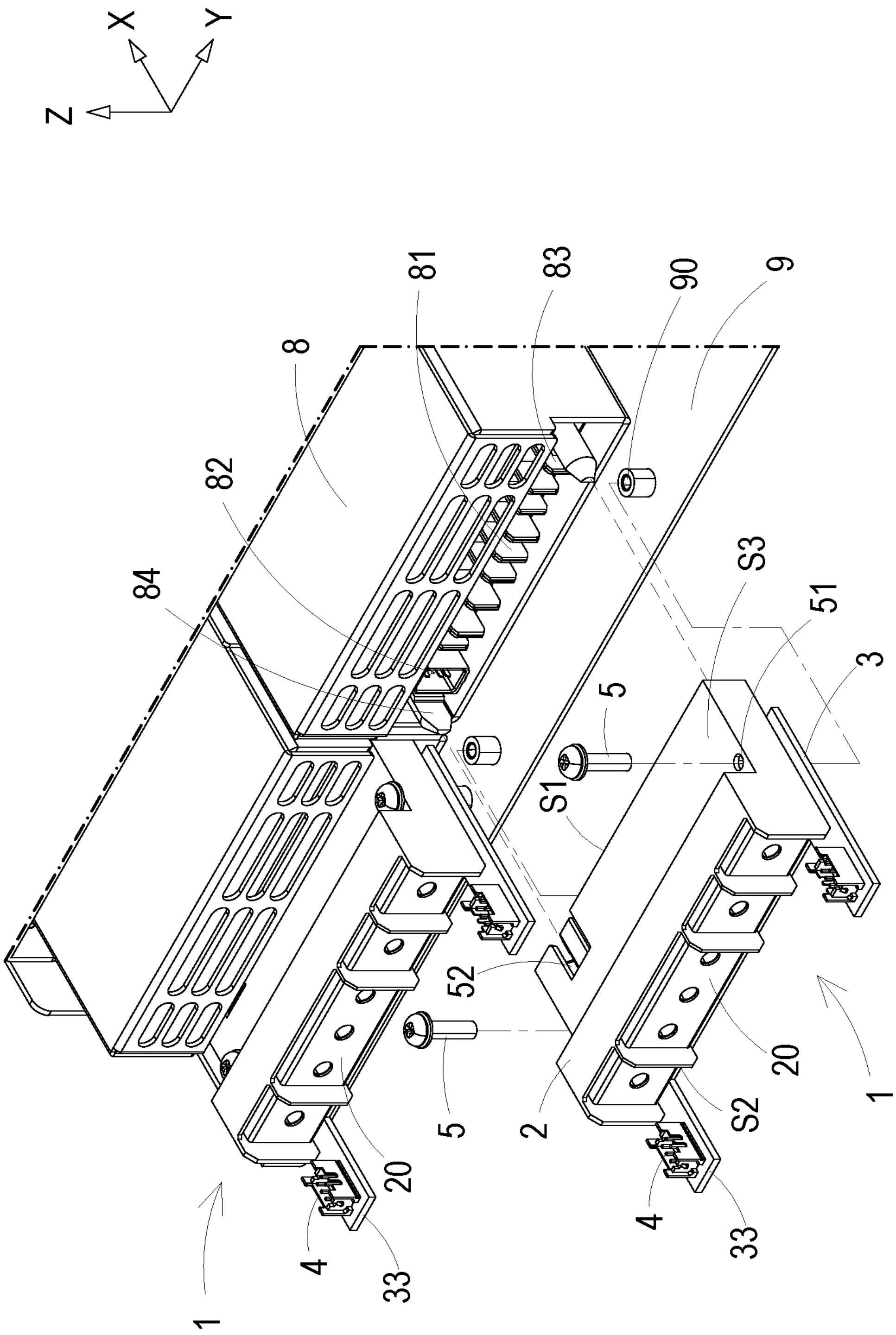
FIG. 5 and FIG. 6 are continuous schematic diagrams showing the docking relationship between the connector and a communication power module according to the embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "front," "rear," "bottom," "upper," "lower," "left," "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments.

Please refer to FIG. 1 to FIG. 6, which illustrates a connector according to an embodiment of the present disclosure. The present disclosure provides a hybrid power connector 1 suitable for connecting to a communication power module 8, and configured to transmit high-current power and signals of the communication power module 8. The connector 1 includes a main body 2, a circuit board 3 and at least one signal connection socket 4. In the embodiment, the main body 2 includes an input side S1 and an output side S2 opposite to each other, a plurality of power inputs 10, a plurality of signal inputs 40, a plurality of power outputs 20 and a plurality of signal outputs 41. In the X axial direction (a first direction), the front input side S1 is corresponding to the rear output side S2 in position. The plurality of power inputs 10 and the plurality of signal inputs 40 are arranged along the Y axial direction (a second direction) and disposed on the front input side S1. The plurality of power outputs 20 are arranged along the Y axial direction (i.e., the second direction) and disposed on the rear output side S1. Preferably but not exclusively, the first direction is perpendicular to the second direction. The plurality of power outputs 20 are electrically connected to the plurality of power inputs 10, the plurality of signal outputs 41 are disposed on a bottom side S4 of the main body 2 and electrically connected to the plurality of signal inputs 40. The bottom side S4 is connected between the input side S1 and the output side S2. The circuit board 3 includes an upper surface 31 and a lower surface 32. The bottom side S4 of the main body 2 is attached to the upper surface 31 of the circuit board 3. The at least one signal connection socket 4 is disposed on the upper surface 31 of the circuit board 3, and electrically connected to the plurality of signal outputs 41 through the circuit board 3.

Notably, the electrical connection of the plurality of power inputs 10 and the plurality of power outputs 20 is not limited to one-to-one. In the embodiment, the plurality of power inputs 10 includes a plurality of first fixing-terminal apertures marked with numbers 11, 12, 13, 14, 15, 16, 17, and 18 respectively, and arranged on the input side along the second direction (i.e., the Y axial direction), as shown in FIG. 1. In addition, the plurality of signal inputs 40 includes a plurality of second fixing-terminal apertures 400 disposed on the input side S1 and arranged at a lateral side (for example the right side) of the input side S1. Preferably but not exclusively, the plurality of second fixing-terminal apertures 400 are arranged in two rows vertically along the third direction (i.e., the Z axial direction). The third direction is perpendicular to the first direction and the second direction. In other embodiments, the numbers, the arrangements and the types of the first fixing-terminal apertures 11, 12, 13, 14, 15, 16, 17, 18 and the plurality of second fixing-terminal apertures 400 are adjustable according to the practical requirements, and the present disclosure is not limited thereto. In the embodiment, the plurality of power outputs 20 are formed by a plurality of copper sheets 21, 22, 23, 24, which are arranged along the second direction (i.e., the Y axial direction), and spaced apart from each other. Preferably but not exclusively, the plurality of copper sheets 21, 22, 23, 24 are isolated from each other. A plurality of partition plates are extended from the main body 2 toward the output side S2 along the first direction (i.e., the X axial direction), so as to electrically isolate each of the copper sheets 21, 22, 23, 24. Preferably but not exclusively, each of the copper sheets 21, 22, 23, 24 of the power outputs 20 includes at least one screw-fixing hole 200, respectively, configured to fix a wire or a copper bar to a corresponding one of the plurality of copper sheets 21, 22, 23, 24 of the power outputs 20 for an electrical connection. Certainly, the present disclosure is not limited thereto. Preferably but not exclusively, in the embodiment, the first fixing-terminal apertures 11, 12 of the power inputs 10 are connected to the copper sheet 21 of the power outputs 20, the first fixing-terminal apertures 13, 14, 15, 16 of the power inputs 10 are connected to the copper sheet 22 of the power outputs 20, the first fixing-terminal aperture 17 of the power inputs 10 is connected to the copper sheet 23 of the power outputs 20, and the first fixing-terminal aperture 18 of the power inputs 10 is connected to the copper sheet 24 of the power outputs 20. When the plurality of first fixing-terminal apertures of the power inputs 10 on the front input side S1 pass through the main body 2 and are directly led to the copper sheets 21, 22, 23, 24 of the power outputs 20 on the rear output side S2, since the power outputs 20 are formed by the copper sheets 21, 22, 23, 24 with the screw-fixing holes 200, it allows to fix a wire or a copper bar to a corresponding one of the plurality of the copper sheets 21, 22, 23, 24 of the power outputs 20 for high-current transmission, so as to reduce the cost of materials and optimize the assembling procedures. In other embodiments, the relationships (positions and numbers) of the first fixing-terminal apertures 11, 12, 13, 14, 15, 16, 17, 18 of the power inputs 10 correspondingly connected to the copper sheets 21, 22, 23, 24 of the power outputs 20 are adjustable according to the practical requirements. The present disclosure is not limited thereto and not redundantly described hereafter.

Figure 6:
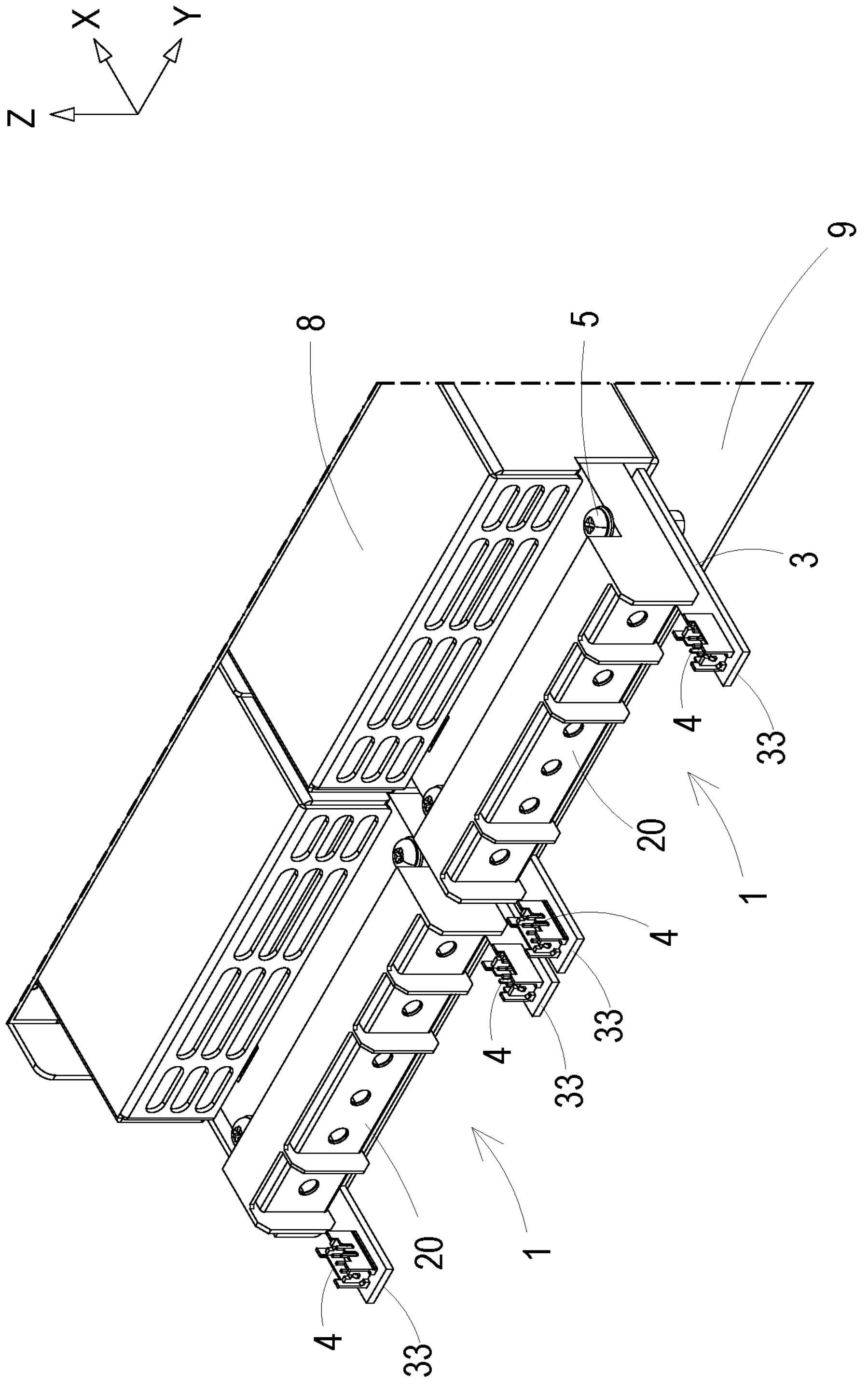

In the embodiment, when the plurality of signal inputs 40 are introduced into the main body 2 through the front input side S1, the configuration of the signal inputs 40 is different from the power inputs 10 electrically connected to the rear power outputs 20 and led out through the output side S2. That is, the plurality of signal inputs 40 are electrically connected to the signal outputs 41 on the bottom side S4 of the main body 2, and then led out through the inner trace of the below circuit board 3, so as to increase the space utilization by the output side S2 of the connector 1. In the embodiment, the circuit board 3 further includes at least one extension portion 33 extended from a side of the circuit board 3 along the X axial direction (i.e., the first direction) and disposed adjacent to the left end or the right end of the output side S2. Moreover, the at least one signal connection socket 4 is disposed on the at least one extension portion 33. After being assembled, the signal connection socket 4 is located at the rear of the output side S3 and adjacent to the left end or the right end of the output side S2. In an embodiment, the circuit board 3 includes two of the extension portions 33 corresponding to two of the signal connection sockets 4. The two extension portions 33 are extended from two opposite ends (i.e., the left end and the right end) on a side of the circuit board 3 and arranged adjacent to the output side S2, respectively, and the two signal connection sockets 4 are disposed on the two extension portions 33 and located on the upper surface 31 of the circuit board 3. When two connectors 1 are arranged along the second direction (i.e., the Y axial direction) for application, as shown in FIG. 6, the right signal connection socket 4 of the left connector 1 and the left signal connection socket 4 of the right connector 1 are arranged adjacent to each other. It is beneficial to realize signal connection with a shorter path, reduce the cost of materials, and avoid the interference of signal transmission. Certainly, the present disclosure is not limited thereto.

In the embodiment, the plurality of signal outputs 41 includes a plurality of signal output pins 410 passing through the bottom side S4 of the main body 2 and connected to the upper surface 31 of the circuit board 3 so as to electrically connect to the circuit board 3. Preferably but not exclusively, in the embodiment, the circuit board 3 includes a plurality of first installation holes 36 passing through the upper surface 31 and the lower surface 32 of the circuit board 3 and spatially corresponding to the plurality of signal output pins 410 of the signal outputs 41. Preferably but not exclusively, the plurality of signal output pins 410 of the signal outputs 41 are fixed to the circuit board 3 through the soldering process, so that the signal can be let out through the trace of the circuit board 3 to the terminal on the circuit board 3, such as the signal connection socket 4 on the extension portion 33, to optimize the assembling process. In the embodiment, the signal connection socket 4 includes a plurality of signal connection pins 42 connected to the upper surface 31 of the circuit board 3. Preferably but not exclusively, the circuit board 3 includes a plurality of second installation holes 37 passing through the upper surface 31 and the lower surface 32 of the circuit board 3 and spatially corresponding to the plurality of signal connection pins 42 of the signal connection socket 4. Preferably but not exclusively, the plurality of signal connection pins 42 of the signal connection socket 4 are fixed to the circuit board 3 through the soldering process. Thereby, the signal can be introduced through the signal inputs 40 on the input side S1, transmitted to the circuit board 3 through the signal outputs 41 on the bottom side S4 of the main body, and then let out through the trace of the circuit board 3 to the signal connection socket 4. The signal transmission path is different from the power transmission path. Notably, the at least one signal connection socket 4 on the extension portion 33 of the circuit board 3 is misaligned to the plurality of power outputs 20 of the main body 2 in a viewing direction from the rear output side S2 to the front input side S1 (i.e., the X axial direction), so as to avoid interfering with each other's installation process.

In the embodiment, the main body 2 further includes a ground input 19 and a ground output 25 electrically connected to each other, the ground input 19 is disposed on the input side S1, and the ground output 25 is disposed on the bottom side S4. Preferably but not exclusively, the ground input 19 is formed in a similar type of the power inputs 10 with the fixing-terminal apertures, and arranged adjacent to a lateral side of the plurality of power inputs 10 along the second direction (i.e., the Y axial direction). Preferably but not exclusively, the ground output 25 includes a plurality of ground output pins 250 passing through the bottom side S4 of the main body 2 and the circuit board 3, so as to be fastened to a housing 9. In an embodiment, the housing 9 includes a communication power module or the other devices. In the embodiment, the circuit board 3 includes a plurality of third installation holes 38 passing through the upper surface 31 and the lower surface 32 of the circuit board 3 and spatially corresponding to the plurality of ground output pins 250 of the ground output 25. In that, the plurality of ground output pins 250 of the ground output 25 are fixed to the circuit board 3 through the soldering process, and pass through the lower surface 32. Thereby, when the connector 1 is fixed to the housing 9, the ground input 19 and the ground output 25 are connected to the housing 9 to realize the grounding. In other embodiments, when the ground output pins 250 of the ground output 25 are fixed to the circuit board 3 through the soldering process, the grounding is guided to a specific area by the trace of the circuit board 3, and then the circuit board 3 is overlapped with the other metal parts to achieve the purpose of grounding. Certainly, the present disclosure is not limited thereto.

In the embodiment, the main body 2 includes at least one first fastening hole 51 passing through the top side S3 and the bottom side S4 of the main body 2. The top side S3 and the bottom side S4 are opposite to each other and located between the input side S1 and the output side S2. The circuit board 3 includes at least one second fastening hole 34, and the at least one first fastening hole 51 is spatially corresponding to the at least one second fastening hole 34, whereby the connector 1 is fixed to the housing 9 along the third directional (i.e., the Z axial direction). Preferably but not exclusively, in the embodiment, a fastening element 5, such as a screw, is utilized to pass through the first fastening hole 51 and the second fastening hole 34 and engage with the engaged element 90 of the housing 9, so that the connector 1 is fixed to the housing 9. In the embodiment, the circuit board 3 includes a ground conductor 35 disposed on the lower surface 32 of the circuit board 3 and electrically connected to the ground output 25 through the circuit board 3. Preferably but not exclusively, in the embodiment, the ground conductor 35 is arranged around an outer periphery of the at least one second fastening hole 34. In that, when the fastening element 5 passes through the first fastening hole 51 and the corresponding second fastening hole 34, and engaged with the engaged element 90 of the housing 9, the connector 1 is fixed to the housing 9, and the ground conductor 35 abuts against the engaged element 90, to simultaneously realize the ground connection of the ground input 19 and the ground output 25 through the ground conductor 35 to the housing 9. In other words, it allows to arrange the ground conductor 35 in conjunction with the main body 2 and the second fastening hole 34 of the circuit board 3 to simultaneously realize the ground connection when the connector 1 is fixed to the housing 9, and the assembling process is further optimized. Certainly, the present disclosure is not limited thereto.

In the embodiment, the connector 1 is assembled with a communication power module 8 on the housing 9 for transmitting the high-current power and signal transmission of the communication power module 8. Preferably but not exclusively, the connector 1 further includes at least one guide groove 52, which is regarded as a guiding structure, recessed on the input side S1, disposed adjacent to at least one lateral end of the input side S1, and configured to guide a docking pin 84 regarded as a docking structure of an external module for insertion from the input side S1 toward the output side S2 along the first direction (i.e., the X axial direction). Consequently, the connector 1 is connected to the external module, and the guide grooves 52 with the asymmetric design provide a fool-proof effect. To be more specific, in the embodiment, two semicircular guide grooves 52 are disposed adjacent to the left and right ends of the input side S1, corresponding to the two left and right docking pins 84 of the communication power module 8, respectively. Certainly, in other embodiments, the positions, the shapes and the numbers of the guide grooves 52 and the docking pins 84 are adjustable according to the practical requirements, and the present disclosure is not limited thereto. The signal inputs 40, the power inputs 10 and the ground input 19 are arranged along the horizontal direction (i.e., the Y axial direction) and located between the two guide grooves 52. Since the signal inputs 40, the power inputs 10 and the ground input 19 are arranged along the horizontal direction (i.e., the Y axial direction) on the input side S1, when the guide grooves 52 disposed on the input side S1 guide the docking pins 84 of the communication power module 8 to insert along the first direction (i.e., the X axial direction) from the input side S1 to the output side S2, it allows to dock the signal connection port 82, the power connection port 81 and the ground port 83 of the communication power module 8 with the signal inputs 40, the power inputs 10 and the ground input 19. In that, the docking of the connector 1 and the communication power module 8 is completed easily, to achieve the power transmission, the signal transmission and the grounding effect, and optimize the assembling process. In the embodiment, the connector 1 is assembled with the communication power module 8, and then the connector 1 is fixed to the housing 9 through the fastening element 5. In another embodiment, the connector 1 is fixed to the housing 9, and then the connector 1 and the communication power module 8 are assembled together. The present disclosure is not limited thereto and not redundantly described hereafter.

Notably, in the above embodiment, many technical features can be combined and adjusted to form a power transmission path from the front input side S1 to the rear output side S2 of the main body 2, and a signal transmission from the front input side S1 through the bottom side S4 of the main body 2 through the bottom surface S4. In other embodiments, the numbers, the sizes, the positions and the corresponding relationships of the power inputs 10, the power outputs 20, the signal inputs 40, the signal outputs 41, the ground input 10 and the ground output 25 are adjustable according to the practical requirements, so as to realize a hybrid power connector 1 suitable for connecting to the communication power module 8. Certainly, the arrangements of the first fastening holes 51, the second fastening holes 34, the ground conductor 35 and the guide grooves 52 are not limited to the illustrated embodiment, and not redundantly described hereafter.

In summary, the present disclosure provides a hybrid power connector suitable for connecting to a communication power module. The connector combines the high-current power supply and signal transmission to reduce the material costs, optimize the assembling process, and improve the space utilization. The power inputs and the power outputs are disposed on the opposite input side and output side of the main body, respectively. Each power output includes for example a copper sheet with a screw-fixing hole, and the wire and the copper bar are fixed to the power output, so as to reduce the cost of materials and optimize the assembling procedures. When the signal inputs and the power inputs are introduced from the front input side, the power inputs are electrically connected to the rear power outputs and led out through the output side, and the signal inputs are electrically connected to the signal outputs on the bottom of the main body and then led out through the inner trace of the circuit board below, so as to increase the space utilization. The signal outputs include a plurality of signal output pins, which are fixed to the circuit board through the soldering process, so that the signal can be led out through the trace of the circuit board to the terminal on the circuit board, such as the signal connection socket on the extension portion, to optimize the assembling process. On the other hand, a plurality of power output pins, disposed on the bottom of the main body and electrically connect to the ground input on the input side, are fixed to the circuit board through the soldering process. In that, the grounding is guided to a specific area through the trace of the circuit board, and the circuit board is overlapped with the other metal parts to achieve the purpose of grounding. It allows to arrange a ground conductor in conjunction with the fastening holes of the main body and the circuit board to simultaneously realize the ground connection when the connector is fixed to the housing, and the assembling process is further optimized. Since the power inputs, the signal inputs and the ground connection terminal are all arranged on the input side, guide grooves can be set on the input side to guide the docking pin of the communication power module for insertion along the direction from the input side to the output side, so as to complete the docking of the communication power module and the connector easily, and optimize the assembling process.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A connector, comprising:

a main body comprising an input side, an output side, a plurality of power inputs, a plurality of signal inputs, a plurality of power outputs and a plurality of signal outputs, wherein the input side is opposite to the output side in a first direction, the plurality of power inputs and the plurality of signal inputs are arranged along a second direction on the input side, the first direction is perpendicular to the second direction, the plurality of power outputs are arranged along the second direction on the output side, the plurality of power outputs are electrically connected to the plurality of power inputs, the plurality of signal outputs are disposed on a bottom side of the main body and electrically connected to the plurality of signal inputs, and the bottom side is connected between the input side and the output side;

a circuit board comprising an upper surface, wherein the bottom side of the main body is attached to the upper surface; and at least one signal connection socket disposed on the upper surface and electrically connected to the plurality of signal outputs through the circuit board.

2. The connector according to claim 1, wherein the circuit board further comprises at least one extension portion extended from a side of the circuit board along the first direction and disposed adjacent to an end of the output side, and the at least one signal connection socket is disposed on the at least one extension portion.

3. The connector according to claim 1, wherein the circuit board further comprises two extension portions and two signal connection sockets, the two extension portions are extended from two opposite ends on a side of the circuit board along the first direction, respectively, and the two signal connection sockets are disposed on the two extension portions, respectively.

4. The connector according to claim 1, wherein the at least one signal connection socket is misaligned to the plurality of power outputs in the first direction.

5. The connector according to claim 1, wherein the plurality of power inputs include a plurality of first fixing-terminal apertures, the plurality of signal inputs include a plurality of second fixing-terminal apertures arranged adjacent to one side of the plurality of first fixing-terminal apertures.

6. The connector according to claim 1, wherein the plurality of power outputs are formed by a plurality of copper sheets arranged along the second direction, and spaced apart from each other.

7. The connector according to claim 1, wherein the plurality of power outputs are formed by a plurality of copper sheets and comprise a plurality of screw-fixing holes respectively configured to fix a wire or a copper bar to a corresponding one of the plurality of power outputs for an electrical connection.

8. The connector according to claim 1, wherein the plurality of signal outputs include a plurality of signal output pins passing through the bottom side of the main body and connected to the upper surface of the circuit board so as to electrically connect to the circuit board.

9. The connector according to claim 1, wherein the main body further comprises a ground input and a ground output electrically connected to each other, the ground input is disposed on the input side, and the ground output is disposed on the bottom side.

10. The connector according to claim 9, wherein the ground output comprises a ground output pin passing through the bottom side of the main body and the circuit board so as to be fastened to a housing.

11. The connector according to claim 10, wherein the main body comprises at least one first fastening hole, the circuit board comprises at least one second fastening hole spatially corresponding to the at least one first fastening hole, wherein the at least one first fastening hole and the at least one second fastening hole are configured to fix the connector to the housing along a third directional, wherein the third direction is perpendicular to the first direction and the second direction, respectively.

12. The connector according to claim 11, wherein the circuit board further comprises a ground conductor disposed on a lower surface of the circuit board and electrically connected to the ground output through the circuit board, and the lower surface is opposite to the upper surface.

13. The connector according to claim 12, wherein the ground conductor is arranged around an outer periphery of the at least one second fastening hole.

14. The connector according to claim 1, further comprising at least one guiding structure recessed on the input side and configured to guide a docking structure of an external module for insertion from the input side along the first direction, so that the connector is connected to the external module.

* * * * *